US011959399B2

(12) United States Patent
Bayer et al.

(10) Patent No.: US 11,959,399 B2
(45) Date of Patent: Apr. 16, 2024

(54) BLADE ROOT RECEPTACLE FOR RECEIVING A ROTOR BLADE

(71) Applicant: MTU Aero Engines AG, Munich (DE)

(72) Inventors: Kilian Bayer, Gerolsbach (DE); David Koch, Munich (DE); Susanne Poesl, Munich (DE); Markus Zeis, Munich (DE); Andreas Hieber, Munich (DE); Jens Truebenbach, Munich (DE); Dieter Freno, Munich (DE); Hermann Nachtigall, Munich (DE); Miriam Rimke, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 17/818,404

(22) Filed: Aug. 9, 2022

(65) Prior Publication Data

US 2023/0046019 A1 Feb. 16, 2023

(51) Int. Cl.
*F01D 5/30* (2006.01)

(52) U.S. Cl.
CPC ...... *F01D 5/3007* (2013.01); *F05D 2250/711* (2013.01); *F05D 2250/712* (2013.01); *F05D 2260/941* (2013.01)

(58) Field of Classification Search
CPC ...................................................... F01D 5/3007
See application file for complete search history.

(56) References Cited

U.S. PATENT DOCUMENTS

| | | | | |
|---|---|---|---|---|
| 3,378,230 A | | 4/1968 | Toomey | |
| 3,809,495 A | | 5/1974 | Stahl | |
| 4,169,694 A | * | 10/1979 | Sanday | F01D 5/3007 416/241 B |
| 5,110,262 A | * | 5/1992 | Evans | F01D 5/3007 416/219 R |
| 6,764,282 B2 | * | 7/2004 | Suciu | F04D 29/38 416/243 |
| 7,306,434 B2 | * | 12/2007 | Goldfinch | F01D 5/3092 416/248 |
| 7,442,007 B2 | * | 10/2008 | Bibor | F01D 5/081 416/193 A |
| 8,734,112 B2 | * | 5/2014 | Virkler | F01D 5/3007 416/248 |
| 9,174,292 B2 | * | 11/2015 | Joslin | B23H 9/10 |
| 9,453,421 B2 | * | 9/2016 | Cairo | F01D 5/3092 |
| 9,739,159 B2 | * | 8/2017 | Carter | F01D 5/147 |

(Continued)

FOREIGN PATENT DOCUMENTS

| | | |
|---|---|---|
| CN | 205172641 U | 4/2016 |
| DE | 2411992 A | 10/1974 |

(Continued)

*Primary Examiner* — Justin D Seabe
(74) *Attorney, Agent, or Firm* — Abel Schillinger, LLP

(57) ABSTRACT

Blade root receptacle for receiving a blade root of a rotor blade of a turbomachine. The blade root receptacle, for radially bearing in a form-fitting manner on the blade root, has a supporting flank which, in terms of a rotation axis, at least in proportions faces radially inward, wherein the supporting flank is provided with a convexity which, when viewed in an axially perpendicular section, at least in portions has a convex shape and, also when viewed in an axially parallel section, at least in portions has a convex shape.

16 Claims, 3 Drawing Sheets

(56) References Cited

U.S. PATENT DOCUMENTS

| | | | | |
|---|---|---|---|---|
| 10,287,898 | B2 * | 5/2019 | Bluck | F01D 5/3023 |
| 2008/0050238 | A1 * | 2/2008 | Durocher | F01D 5/3007<br>416/219 R |
| 2016/0305259 | A1 | 10/2016 | Evans et al. | |
| 2019/0169991 | A1 | 6/2019 | Silet et al. | |
| 2022/0268164 | A1 | 8/2022 | Pernleitner et al. | |

FOREIGN PATENT DOCUMENTS

| | | | | |
|---|---|---|---|---|
| DE | 102019210699 | A1 | 1/2021 | |
| FR | 3075255 | A1 | 6/2019 | |
| WO | WO-2009100795 | A1 * | 8/2009 | F01D 5/3007 |

* cited by examiner

BLADE ROOT RECEPTACLE FOR RECEIVING A ROTOR BLADE

CROSS-REFERENCE TO RELATED APPLICATIONS

The present application claims priority under 35 U.S.C. § 119 of German Patent Application No. 102021120876.9, filed Aug. 11, 2021, the entire disclosure of which is expressly incorporated by reference herein.

BACKGROUND OF THE INVENTION

1. Field of the Invention

The present invention relates to a blade root receptacle for receiving a blade root of a rotor blade of a turbomachine.

2. Discussion of Background Information

A turbomachine in functional terms is made up of a compressor, a combustion chamber and a turbine, wherein in the case of an aircraft engine inducted air is compressed in the compressor and in the downstream combustion chamber is combusted together with added kerosine. The hot gas created, a mixture of combustion gas and air, flows through the downstream turbine and is expanded in the process. The turbine and the compressor are in each case typically constructed in multiple stages, each stage comprising a guide vane assembly and a rotor blade assembly. Each blade assembly is constructed from a plurality of blades which are successive in an encircling manner and, depending on the application, are surrounded by a flow of the compressor gas, or the hot gas, respectively.

A rotor blade assembly, for example, here can have a rotor disk on which the rotor blades are in each case assembled in a form-fitting manner so as to be successive in an encircling manner. To this end, the rotor disk at different encircling positions can in each case be provided with a blade root receptacle, specifically a profiled groove that extends axially. One blade root can be inserted into each profiled groove, the external wall face of said blade root, conjointly with the flanks of the blade root receptacle that delimit the profiled groove, in this instance forming a form-fit. By virtue of this profiled feature the rotor blade is held radially in a form-fitting manner, in particular in relation to the centrifugal forces during operation.

SUMMARY OF THE INVENTION

The present invention provides an improved receptacle for a blade root. In said receptacle at least one supporting flank, onto which the blade root is pressed during operation, is provided with a convexity which

- when viewed in an axially perpendicular section, at least in portions has a convex shape, and also,
- when viewed in an axially parallel section, at least in portions has a convex shape.

The convexity, or convex shape, respectively, is thus developed not only in terms of the encircling or radial extent of the supporting flank, respectively, (axially perpendicular section), but also with respect to the longitudinal extent thereof, thus in the axial direction (axially parallel section). This convexity or bulge, respectively, which to this extent is configured in two directions, can be advantageous in terms of the mechanical structure, for example, as a result enabling a more uniform transmission of load between the blade root and the supporting flank, for instance. In comparison to a planar supporting flank, in which dissimilar bearing regions can result owing to production-related reasons, for example, a reproducible bearing face can be achieved by the convex configuration, for example.

In some embodiments, comparatively small tolerances can be provided only locally in the region of the convexity, and/or the influence of variances outside the convexities can be reduced.

Preferred embodiments of the invention are to be found in the dependent claims and the entire disclosure, wherein a detailed distinction between aspects of the device and of the method or application, respectively, is not always made when representing the features; the disclosure is in any case to be considered implicit in terms of all categories of claims. Furthermore, said disclosure is at all times directed toward the blade root receptacle per se as well as toward a blade assembly having a corresponding blade root receptacle and a rotor blade, and toward a rotor disk having a plurality of blade root receptacles.

The designations "axial", "radial" and "encircling", and the associated directions (axial direction, etc.) refer to the rotation axis about which the blade root receptacle having the rotor blade, in particular thus also the disk or the rotor blade assembly, respectively, rotate(s) during operation. Said rotation axis is typically congruent with a longitudinal axis of the turbomachine, thus of the aircraft engine, for example. The axially perpendicular section is perpendicular to the rotation axis; the axially parallel section plane is parallel thereto and herein can in particular be perpendicular to the supporting flank.

The supporting flank "at least in proportions faces radially inward"; a surface normal on the supporting flank thus has at least one inward-directed radial component. Depending on the details of the design embodiment, said supporting flank may additionally have an encircling component, thus be oblique. When viewed in the axially perpendicular section, the supporting flank can extend, for example, between a concave curvature portion, which leads radially into a radially inner free flank or the groove base, and a convex curvature which leads into a radially outer free flank or the disk circumference, for example. The root blade receptacle overall can form a so-called fir-tree profile, for example, this however representing only one possibility.

Independently of these details, the blade root, in particular a convexity thereof that is substantially complementary to a blade root receptacle, is pressed against the supporting flank during operation. Overall, the blade root receptacle here can also have more than one supporting flank, for example in a mirror-symmetrical manner have a further supporting flank which is offset in the encircling direction and/or one or a plurality of supporting flanks radially within or outside. In this instance, in total more than the one supporting flank can be shaped with a convexity; a corresponding design of all of the supporting flanks of the blade root receptacle, or else of a sub-quantity thereof, is possible. In general, "a" and "an" in the context of this disclosure are to be considered indefinite articles and thus to also always mean "at least one"; there can thus also be a plurality of configurations in the supporting flank, or in a respective supporting flank, for example—see below for details.

In general, the convex curvature can axially also extend across the entire supporting flank. In a preferred embodiment, said convex curvature, when viewed in the axially parallel section, in the direction of a first axial end of the supporting flank however transitions to a concave profile, the profile between the first end and the convex curvature at least in portions thus being concave. The transition from the convex profile to the concave profile can be spaced apart from the first axial end by, for example, at least 5% of an axial length of the supporting flank, further potential lower limits being, for example, at least 10% or 15%, respectively (and theoretical upper limits being 70%, 50% or 30%, respectively). A certain spacing of the convex shape from the (first) axial end of the supporting flank can be advantageous in terms of the mechanical structure, for example.

In a preferred embodiment the supporting flank, when viewed in the axially parallel section, in the direction of the first axial end adjoining the concave profile runs in a rectilinear manner into the first end. The rectilinear portion can in particular be axially parallel. In general, the "first end", in terms of the arrangement of the turbomachine, can be axially at the front or axially at the rear, thus be upstream or downstream.

According to one preferred embodiment, when viewed in the axially parallel section, the convex shape also in the direction of a second axial end, opposite the first axial end, transitions to a concave profile, a concave profile thus adjoining the convex shape axially on both sides. Depending on the position of the convexity, a rectilinear profile which runs, in particular so as to be axially parallel, into the second end of the supporting flank can also adjoin the concave profile in the direction of the second axial end (alternatively however, a further convexity may also follow—see below for details).

A further preferred embodiment relates to the profile of the supporting flank in the axially perpendicular section, the convex shape in the latter specifically transitioning to a concave profile, preferably on both sides. The latter means that, in terms of a breadth direction of the supporting flank in which the breadth of the latter is measured in the axially perpendicular section (and said breadth having a circumferential component and optionally a radial component, depending on the orientation of the supporting flank), a concave profile adjoins the convex shape on both sides. A rectilinear profile can adjoin the concave profile on one side or both sides in the breadth direction.

In a preferred embodiment a further convexity is configured in the supporting flank, there thus being at total of at least two convexities in the supporting flank. When viewed in an axially perpendicular section as well as in an axially parallel section, the further convexity can in each case have a convex shape. In a preferred design embodiment the (first) and the further convexity are mutually offset in the axial direction; alternatively or additionally said (first) and said further convexity can be mutually offset in the breadth direction of the supporting flank. In the latter case, they can thus be offset with a circumferential component and, depending on the orientation of the supporting flank (see above), with a radial component.

In general, a large number of convexities can also be formed in the supporting flank, wherein potential upper limits can be, for example, at most 30, at most 20 or at most 10 convexities, respectively, an even larger number however also being possible in principle. According to one preferred embodiment however, exactly three convexities are provided in the supporting flank, said three convexities conjointly in a reproducible manner forming a bearing for the assigned face or flank, respectively, of the blade root. The three convexities preferably lie in the supporting flank so as to be mutually offset in such a manner that said three convexities conjointly in a defined manner describe a plane (thus do not lie on a common straight line).

In some embodiments the number of convexities on one or each supporting flank of the blade root receptacle is in the range from 1 to about 10 per supporting flank, preferably about 2 to about 7 per supporting flank, in particular 3 or 4 per supporting flank.

In some embodiments the, in particular each of the, convexities (40) in each section perpendicular to the supporting flank through the convexity has a profile having a continuously more differentiable profile. In other words, the profile in these embodiments is smooth and free of spikes, jumps and/or edges. This enables a defined bearing action which to a certain extent is planar and particular advantageous in terms of mechanical stress.

In some embodiments the ratio H/D of height H of the convexity to smallest transverse dimension D of the convexity within the supporting flank, for the convexity, in particular for each convexity, is in the range from about 1:2 to about 1:500, in particular from about 1:10 to about 1:200, or from about 1:100 to about 1:5000. This enables a bearing action which is particularly advantageous in terms of mechanical stress.

The invention furthermore relates to a blade assembly having a blade root assembly disclosed herein and a rotor blade of which the blade root is disposed in the blade root receptacle. The blade root bears on the supporting flank, said blade root during operation being pressed against the latter by centrifugal force.

The invention furthermore relates to a rotor disk for a rotor blade assembly of a turbomachine, in particular of an aircraft engine. The rotor disk, which overall can be of an annular shape, for example, has a plurality of rotor blade receptacles which are distributed in an encircling manner and preferably in each case designed with a supporting flank according to the present disclosure.

The invention furthermore relates to a method for producing a blade root receptacle, or the blade assembly or rotor disk disclosed herein, respectively, wherein the supporting flank is subtractively machined from a solid material. This is preferably performed by electrochemical machining (EMC) by way of which the desired surface structure can be particularly readily achieved.

BRIEF DESCRIPTION OF THE DRAWINGS

The invention will be explained in more detail hereunder by means of an exemplary embodiment, wherein the individual features in the context of the independent claims may also be relevant to the invention in another combination, and a detailed distinction between the different categories of claims is furthermore also not made.

In the drawings.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
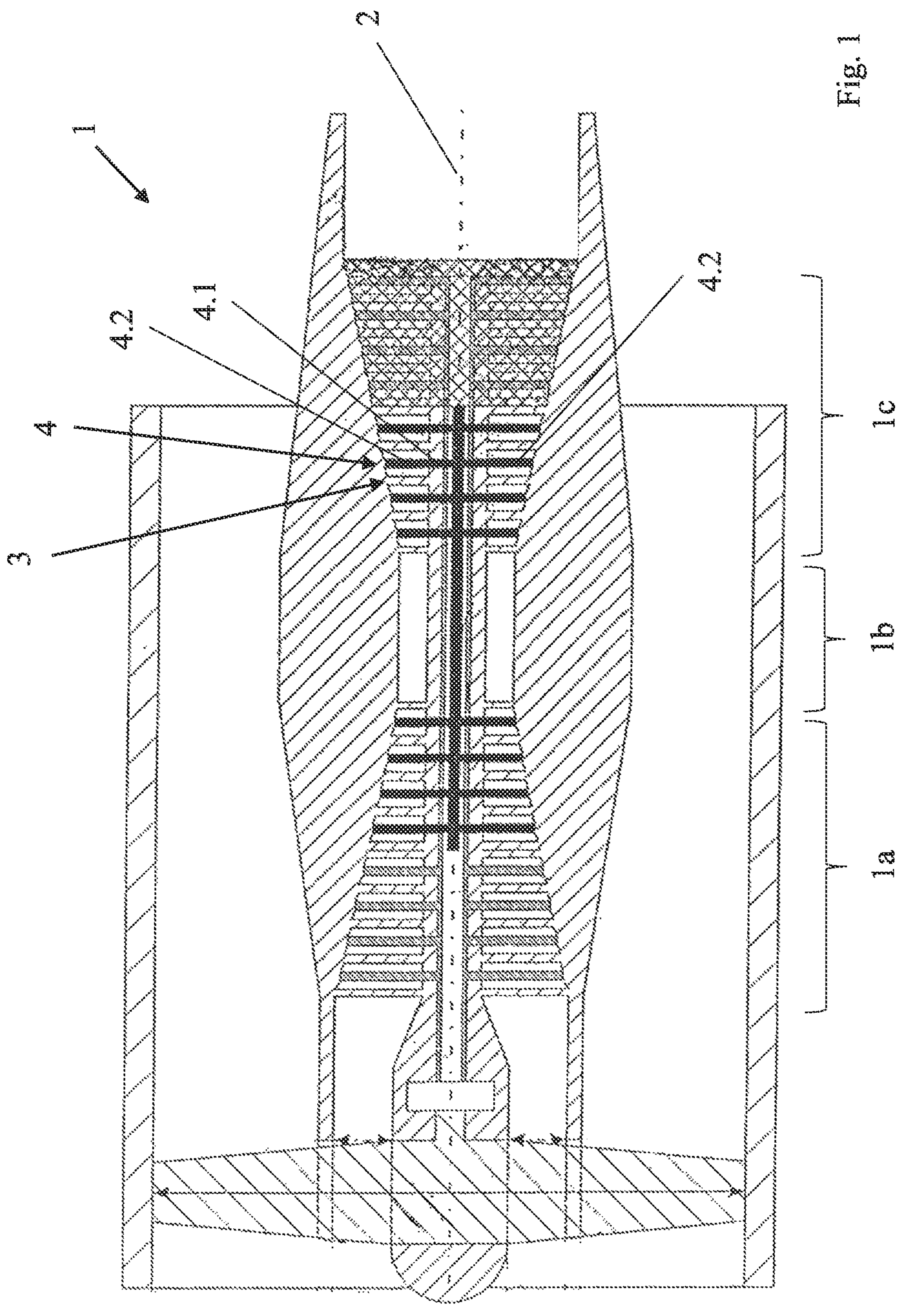
FIG. 1 shows a turbomachine, specifically a turbofan engine, in an axial section.

FIG. 1 shows a turbomachine 1, specifically a turbofan engine, in an axial section. The turbomachine 1 in functional terms is made up of a compressor 1*a*, a combustion chamber 1*b* and a turbine 1*c*. The compressor 1*a* as well as the turbine 1*c* are in each case constructed from a plurality of stages. Each one of the stages is composed of a guide vane assembly and a rotor blade assembly. For the sake of clarity, the guide vane assembly 3 and the associated rotor blade assembly 4 for only one of the stages of the turbine 1*c* are provided with reference signs. The inducted air is compressed in the compressor 1*a* and in the downstream combustion chamber 1*b* is combusted together with added kerosine. The hot gas flows through the hot gas duct and in the process drives the rotor blade assemblies that rotate about the rotation axis 2. The rotor blade assembly 4 comprises a rotor disk 4.1 in which a plurality of rotor blades 4.2 are inserted so as to be distributed in an encircling manner.

Figure 2:
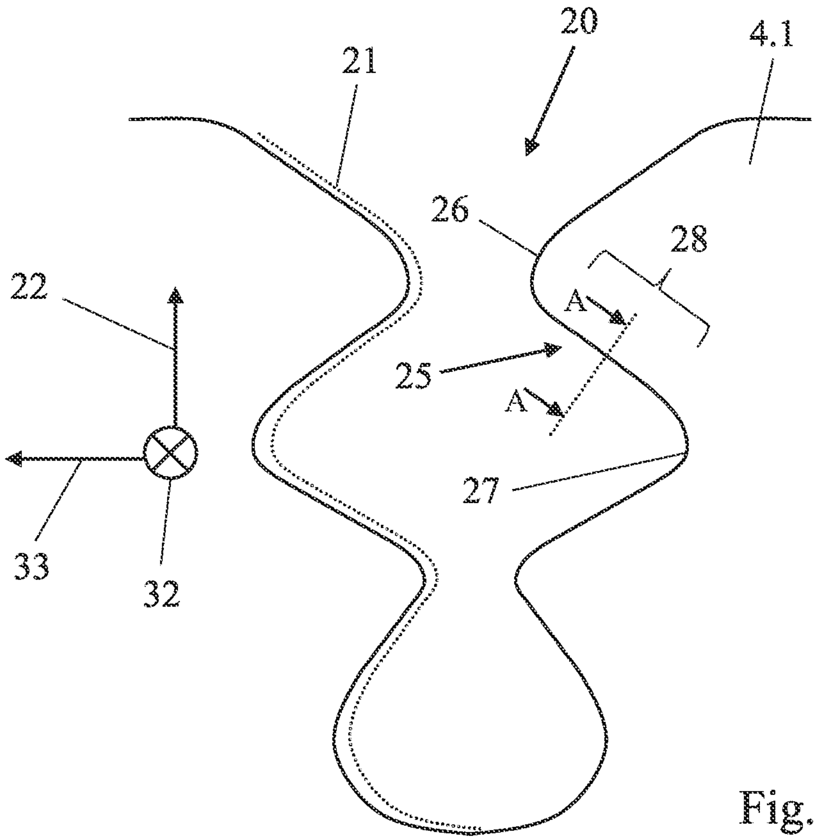
FIG. 2 shows a blade root receptacle in a schematic axial view.

FIG. 2 shows a fragment of the rotor disk 4.1 in an axial view, thus in a view onto said rotor disk 2 along the rotation axis 2. A blade root receptacle 20 which is incorporated in the form of a profiled groove that axially penetrates the rotor disk 4.1 is provided in the rotor disk 4.1. A blade root 21 of the respective rotor blade 4.2 is inserted into the blade root receptacle 20, said blade root being only schematically indicated and in terms of the radial direction 22 being held in a form-fitting manner in said blade root receptacle 20. During operation said blade root 21 is pressed against supporting flanks 25 of the blade root receptacle, only one of said supporting flanks 25 being provided with a reference sign and being discussed in more detail here.

The supporting flank 25 extends between a convex curvature portion 26 and a concave curvature portion 27, the breadth 28 of said supporting flank 25 to be seen in the illustration according to FIG. 2. The supporting flank 25 has the longitudinal extent thereof perpendicularly thereto, thus in the axial direction 32. Said supporting flank 25 presently is oriented in such a manner that said supporting flank 25 in proportions runs in the radial direction 22 and also in the encircling direction 33.

Figure 3:
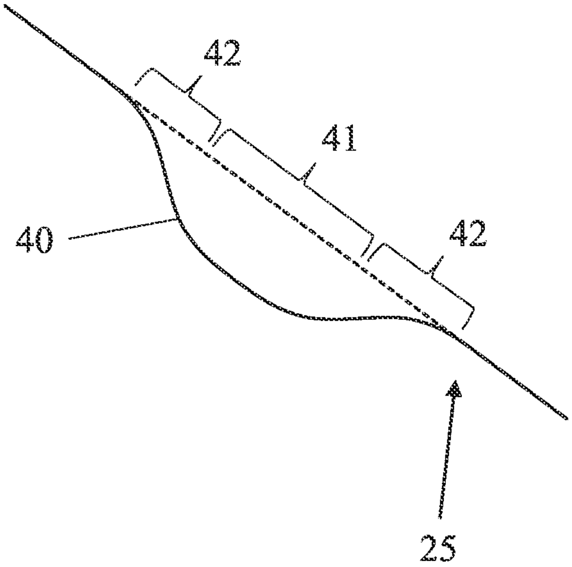
FIG. 3 shows a supporting flank of the blade root receptacle according to FIG. 2 in an axially perpendicular section.

FIG. 3 shows the supporting flank 25 in a detailed view, specifically in a section perpendicular to the axial direction 32. Said section allows a convexity 40 of a convex shape 41 to be seen. The convex shape 41 on both sides transitions to a concave profile 42.

Figure 4:
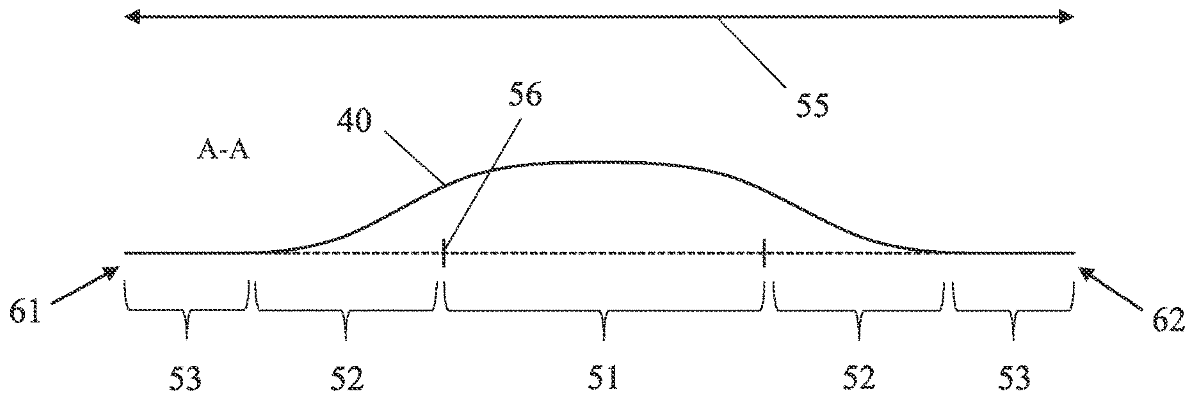
FIG. 4 shows the supporting flank according to FIG. 3 in an axially parallel section.

FIG. 4 shows the convexity 40 in a section plane perpendicular thereto, specifically in an axially parallel section A-A (cf. FIG. 2 with respect to the position of the section plane). The convexity 40 also has a convex shape 51 in this section, said convex shape 51 in the present example in the direction of a first axial end 61 as well as in the direction of a second axial end 62 transitioning in each case first to a concave profile 52 and thereafter to a rectilinear profile 53. In terms of an axial length 55 of the supporting flank 25, a transition 56 between a convex/concave extent in this example is approximately at a distance of 30% from the first axial end 61 (this laterally reversed also applying to the other transition and the second axial end 62).

Figure 5:
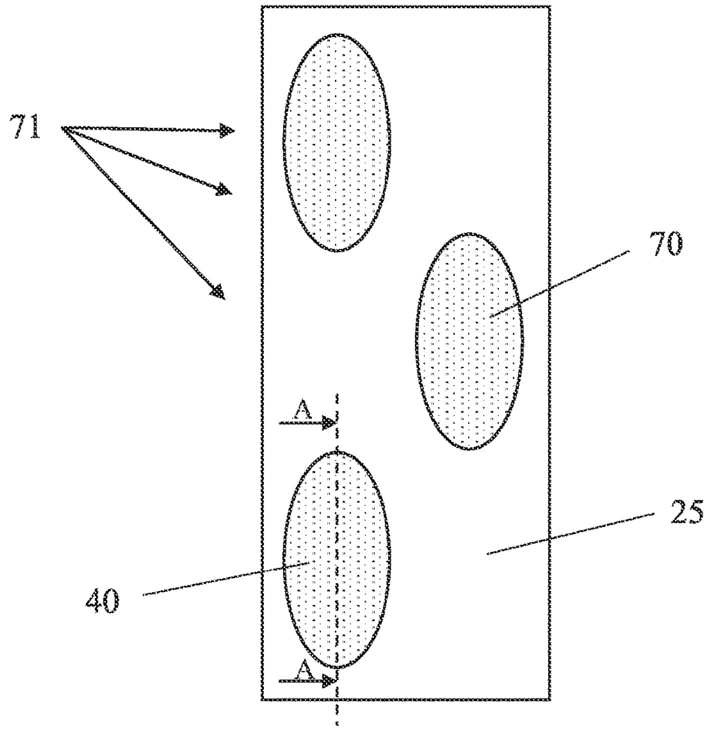
FIG. 5 shows a supporting flank of an alternative design in a schematic plan view.

FIG. 5 shows a supporting flank 25 in a schematic plan view in which, in addition to the (first) convexity 40, a further convexity 70, which is axially and also in an encircling or radial manner, respectively, offset in relation to the first convexity 40, is provided. A total of three convexities 71, which conjointly form a defined bearing face, are provided in the supporting flank 25.

LIST OF REFERENCE SIGNS

Turbomachine 1
Compressor 1*a*
Combustion chamber 1*b*
Turbine 1*c*
Rotation axis/Longitudinal axis 2
Guide vane assembly 3
Rotor blade assembly 4
Rotor disk 4.1
Plurality of rotor blades 4.2
Blade root receptacle 20
Blade root 21
Radial direction 22
Supporting flanks 25
Convex curvature portion 26
Concave curvature portion 27
Breadth 28
Axial direction 32
Encircling direction 33
First convexity 40
Convex shape 41
Axially parallel section A-A
Convex shape 51
Concave profile 52
Rectilinear profile 53
Axial length 55
Transition 56
First axial end 61
Second axial end 62
Further convexity 70
Three convexities 71

What is claimed is:

1. A blade root receptacle, wherein the receptacle is suitable for receiving a blade root of a rotor blade of a turbomachine and the blade root receptacle, for radially bearing in a form-fitting manner on the blade root, comprises a supporting flank which in terms of a rotation axis at least in proportions faces radially inward, the supporting flank being provided with two or more convexities which, when viewed in an axially perpendicular section, at least in portions have a convex shape, and also, when viewed in an axially parallel section, at least in portions have a convex shape, at least some of the two or more convexities being separated in axial direction.

2. The blade root receptacle of claim 1, wherein, when viewed in the axially parallel section, the convex shape of the supporting flank transitions to a concave profile toward a first axial end of the supporting flank.

3. The blade root receptacle of claim 2, wherein, when viewed in the axially parallel section, a point at which the supporting flank transitions from the convex shape to the concave profile is spaced apart from the first axial end by at least 5% of an axial length of the supporting flank.

4. The blade root receptacle of claim 3, wherein, when viewed in the axially parallel section, the supporting flank runs in a rectilinear manner into the first end.

5. The blade root receptacle of claim 2, wherein, when viewed in the axially parallel section, the convex shape transitions to a concave profile also toward a second axial end of the supporting flank, opposite the first axial end of the supporting flank.

6. The blade root receptacle of claim 1, wherein, when viewed in the axially perpendicular section, the convex shape transitions to a concave profile.

7. The blade root receptacle of claim 1, wherein a convexity in each section perpendicular to the supporting flank through the convexity has a profile which is free of spikes, jumps and/or edges.

8. The blade root receptacle of claim 1, wherein for at least one of the two or more convexities a ratio of height to smallest transverse dimension of the convexity ranges from 1:2 to 1:500.

9. The blade root receptacle of claim 1, wherein for at least one of the two or more convexities a ratio of height to smallest transverse dimension of the convexity ranges from 1:10 to 1:200.

10. The blade root receptacle of claim 1, wherein for at least one of the two or more convexities a ratio of height to smallest transverse dimension of the convexity ranges from 1:100 to 1:500.

11. The blade root receptacle of claim 1, wherein at least some of the two or more convexities are mutually axially offset.

12. The blade root receptacle of claim 1, wherein at least some of the two or more convexities are mutually offset by a radial component and/or an encircling component.

13. The blade root receptacle of claim 1, wherein three convexities are formed in the supporting flank.

14. A blade assembly, wherein the assembly comprises the blade root receptacle of claim 1 and a rotor blade whose blade root is disposed in the blade root receptacle and bears on the supporting flank.

15. A rotor disk, wherein the rotor disk is suitable for a rotor blade assembly of a turbomachine and comprises a plurality of blade root receptacles according to claim 1.

16. A method for producing the blade root receptacle of claim 1, wherein the method comprises machining the supporting flank of the blade root receptacle in each case by electrochemical machining from a solid material.

* * * * *